United States Patent

Conrad et al.

[11] 3,906,234
[45] Sept. 16, 1975

[54] GAMMA CAMERA

[75] Inventors: Bernhard Conrad, Erlangen-Bruck;
Karl-Georg Heinzelmann,
Uttenreuth, both of Germany

[73] Assignee: Siemens Aktiengesellschaft, Munich, Germany

[22] Filed: Sept. 24, 1973

[21] Appl. No.: 399,713

[30] Foreign Application Priority Data
Oct. 5, 1972 Germany............................ 2248731

[52] U.S. Cl............ 250/366; 250/213 VT; 250/368
[51] Int. Cl................................................ G01t 1/202
[58] Field of Search...... 250/213 VT, 366, 368, 369

[56] References Cited
UNITED STATES PATENTS

| | | | |
|---|---|---|---|
| 3,462,601 | 8/1969 | Sternglass..................... | 250/213 VT |
| 3,652,855 | 3/1972 | McIntyre ............................ | 250/366 |
| 3,683,185 | 8/1972 | Muehllehner...................... | 250/366 |
| 3,758,780 | 9/1973 | Lee..................................... | 250/366 |
| 3,774,032 | 11/1973 | Lange ................................ | 250/366 |
| 3,784,819 | 1/1974 | Martone et al. ................... | 250/366 |

Primary Examiner—Harold A. Dixon
Attorney, Agent, or Firm—Waters, Schwartz & Nissen

[57] ABSTRACT

A gamma camera which obviates the distortion of locating signals generally caused by the varied light conductive capacities of the light conductors in that the flow of light through each light conductor may be varied by means of a shutter. A balancing of the flow of light through each of the individual light conductors, in effect, collective light conductors may be balanced on the basis of their light conductive capacities or properties, so as to preclude a distortion of the locating signals caused by the varied light conductive properties of the light conductors. Each light conductor has associated therewith two, relative to each other, independently adjustable shutters, of which one forms a closure member and the other an adjusting shutter. In this embodiment of the invention it is thus possible to block all of the light conductors leading to a photoelectric transducer, with the exception of those light conductors which are to be balanced. The balancing of the individual light conductors may then be obtained on the basis of the output signals of the photoelectric transducer.

3 Claims, 6 Drawing Figures

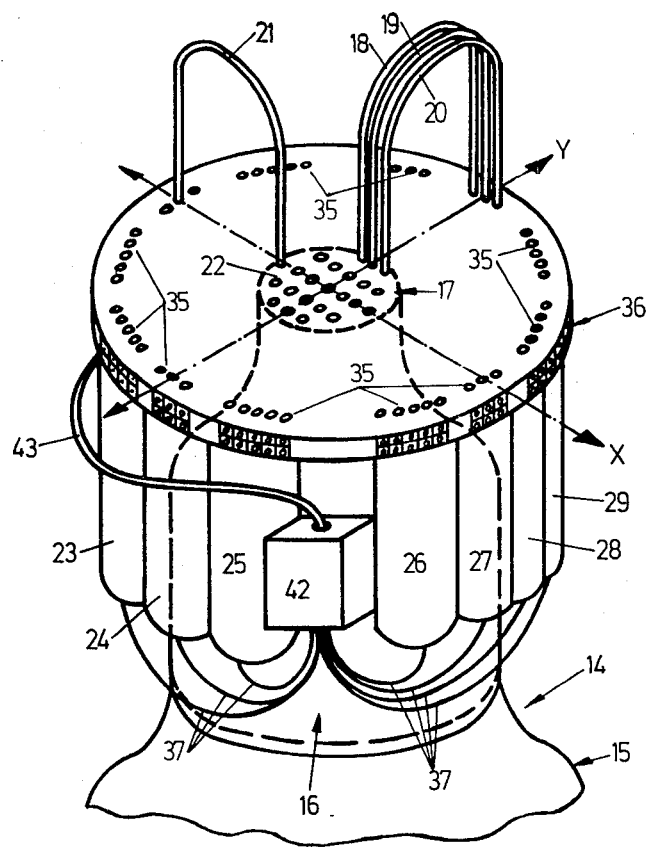
Fig. 2
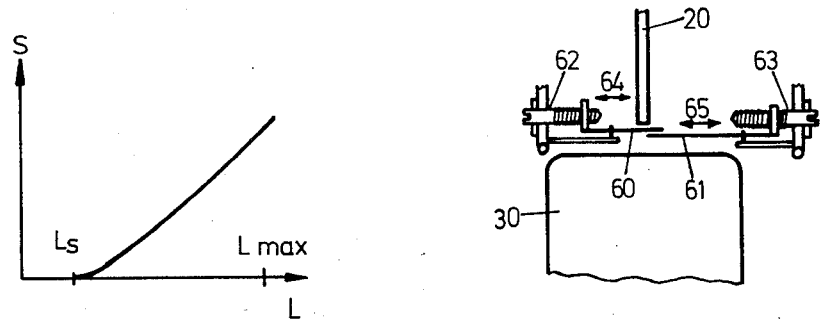
Fig. 5
Fig. 6

GAMMA CAMERA

FIELD OF THE INVENTION

The present invention relates to a gamma camera for determining the distribution of radioactive materials in a body through a scintillation layer, including a thereto subsequently positioned image intensifier, photoelectric transducers which are connected through light conductors to the outlet screen of the image intensifier, and an evaluating and indicating installation associated with the transducer.

DISCUSSION OF THE PRIOR ART

A gamma camera of the foregoing type is described in German laid-open patent specification No. 1,614,439. In the prior art gamma camera there are employed four photomultipliers as photoelectric transducers, which are connected to the output screen of the image intensifier through four light conductors. A signal which is characteristic of the location of a scintillation in the scintillation layer is thereby obtained through conversion of the output signals of the photomultiplier in a differentiating member.

In a gamma camera, in which the photoelectric transducers receive their input signals through light conductors, there may result a distortion of the output signals of the photoelectric transducers inasmuch as the light conductors of the photoconductive system may have varied light conductive capacities or properties. A distortion of that type may occur in the gamma camera constructed according to the German laid-open specification No. 1,614,439; as well as in a gamma camera in which, in lieu of only four photomultipliers which communicate with four light conductors, there is employed a plurality of light conductors for obtaining the positioning or locating signals, which are distributed among the photomultipliers so that the output screen of the image intensifier is divided pursuant to a coordinate system.

SUMMARY OF THE INVENTION

It is, accordingly, an object of the present invention to provide a gamma camera pursuant to the above described art which obviates the distortion of the locating signals generally caused by the varied light conductive capacities of the light conductors.

This task is inventively solved in that the flow of light through each light conductor may be varied by means of a shutter. Through the object of the invention there thus becomes possible a balancing of the flow of light through each of the individual light conductors, in effect, collective light conductors may be balanced on the basis of their light conductive capacities or properties, so as to preclude a distortion of the locating signals caused by the varied light conductive properties of the light conductors.

An advantageous and practical embodiment of the invention consists in that each light conductor has associated therewith two, relative to each other, independently adjustable shutters, of which one forms a closure member and the other an adjusting shutter. In this embodiment of the invention it is thus possible to block all of the light conductors leading to a photoelectric transducer, with the exception of those light conductors which are to be balanced. The balancing of the individual light conductors may then be obtained on the basis of the output signals of the photoelectric transducer.

BRIEF DESCRIPTION OF THE DRAWINGS

Further advantages and constructional elements of the invention may be readily ascertained from the following detailed description of an exemplary embodiment, taken in conjunction with the accompanying drawings, in which:

FIG. 2 shows, in perspective, an enlarged fragmentary portion of the gamma camera of FIG. 1, illustrating the image intensifier, as well as the arrangement of the light conductors and of the photoelectric transducer;

FIG. 3 is a diagrammatic illustration of the arrangement of the light conductor ends on the output screen of the image intensifier;

FIG. 4 is a fragmentary section of the output screen of the image intensifier and the therewith associated light conductor ends;

FIG. 5 is a graph illustrative of the duration of the output signal of a photoelectric transducer as utilized in the invention in dependence on an input signal; and FIG. 6 illustrates an arrangement of an adjustable shutter between a light conductor and a photoelectric transducer.

DETAILED DESCRIPTION

Figure 1:
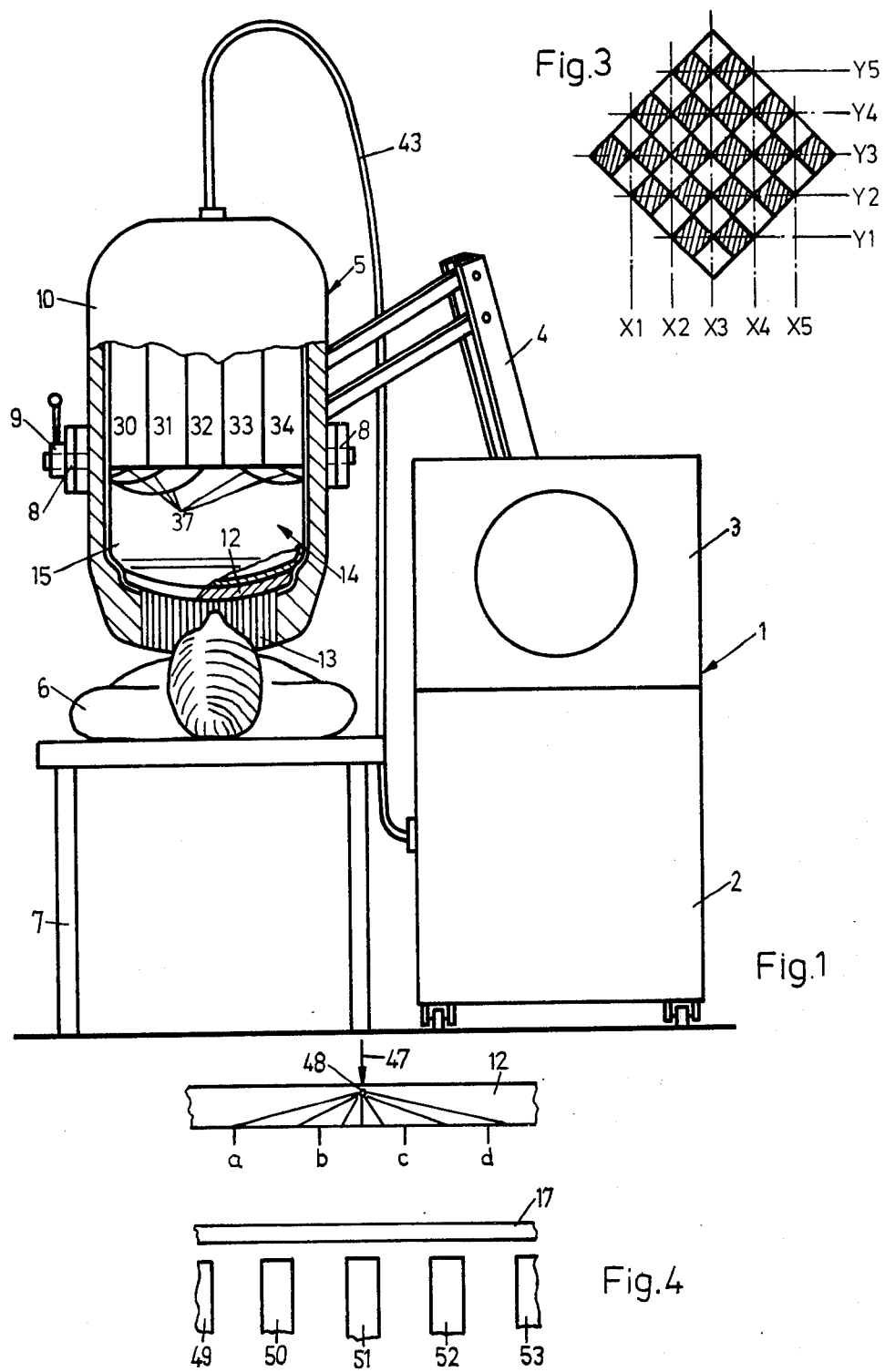
FIG. 1 illustrates an overall elevational view of a gamma camera according to the present invention in connection with thereby associated auxiliary apparatus.

Referring now in detail to the drawings, in FIG. 1 there is shown a cabinet 1 having provided in the lower portion 2 thereof the required components for the evaluation of the signals of a gamma camera. The upper portion 3 of the cabinet 1 contains a cathode ray tube for rendering visible the distribution of radioactive materials in a body.

Onto a support arm 4 there is fastened a gamma camera 5, the latter of which is shown partly sectioned in FIG. 1. The gamma camera 5 lies, in FIG. 1, suspended above a patient 6 who is resting on a support structure 7. The gamma camera 5 is rotatable about an axis 8, and is adapted to be restrained in a selected position by means of a screw member 9.

The gamma camera 5 includes a housing 10 formed of a ray absorbent material, for example, lead, having located in an end surface thereof a collimator 13 for the transmission of radioactive rays emanating from the patient 6 onto a scintillation crystal 12. Within the housing 10 an image transducer arrangement 14 communicates with the crystal 12. This arrangement consists of two image intensifiers which cascade-like adjoin each other so as to sufficiently intensify the scintillations occurring in the crystal 12.

In FIG. 2 there is illustrated an image intensifier 15 which is associated with the scintillation crystal 12, and the thereto connected image intensifier 16. At the output screen 17 of the image intensifier 16 there connect the input surfaces of a light conductor system, designated in FIG. 2 by light conductors 18 through 21. Of the remaining light conductors, only input surfaces 22 are shown. The light conductors of the light conductor system extend in a semi-circular arc to the inputs of twelve photomultipliers, of which in FIG. 1 there may be ascertained photomultipliers 30 through 34, and in FIG. 2 photomultipliers 23 through 29. The light conductors of the light conductor arrangement may be formed of polished glass or plastic, and may each have square cross-sections approximately 4 mm in length for each side wall. The radii of curvature of all of the photoconductors are of equal size so as to afford a simple construction. The curves of the light conductors are vertically stacked so as to, in this manner, provide a dispersal of the light conductor system.

The photoelectric transducer-forming photomultipliers 23 through 34 are located on the housing of the image intensifier 16 so as to extend parallel to each other, and lie with their input surfaces approximately parallel to the output screen 17 of the image intensifier 16. By means of this arrangement of the photomultipliers 23 through 34 there is afforded a compact construction of the entire gamma camera, and a simple construction and dispersal of the light conductor system. The utilization of light conductors having equal radii of curvature simplifies the construction thereof still further.

In FIG. 2 the cross-sections of all of the light conductors are illustrated on the output side, in effect, in the region of the input surfaces of the photomultipliers 23 through 34, and are designated by reference numeral 35. The photomultipliers 22 through 34 are supported by a plate 36, which additionally also supports the light conductors of the photoconductive system.

The photomultipliers 22 through 34 are connected by means of conduits 37 with a receptacle 42, the latter of which contains the pre-amplifiers associated with the photomultipliers 22 through 34. A conduit 43 leads from the pre-amplifiers in receptacle 42 to the lower portion 2 of the cabinet 1, in which is effected the further conversion of the output signals of the photomultipliers 22 through 34 to afford visualization of the distribution of activity at the upper portion 3.

In FIG. 3 there is principally illustrated the association of the photomultiplier with the light conductors, and in effect with respect to their input surfaces. FIG. 3 illustrates a figure in accordance with a chess board, in which it is assumed that in each field or square of this figure there lies an input surface. The figure in accordance with FIG. 3 is divided into five X-coordinates X1 through X5 and five Y-coordinates Y1 through Y5. The coordinates X1 through X5 and Y1 through Y5 extend in accordance with the diagonals of a chess board or extend parallel relative thereto. All of the input surfaces which are cut by a coordinate are associated thereby with a photomultiplier. In accordance therewith, both input surfaces which are cut by the coordinate X1 lead to the input of a photomultiplier, and the four input surfaces which are cut by the coordinate X2 to the input of a second photomultiplier, and so forth. Correspondingly, both cross-hatched input surfaces, which are cut by the coordinate Y1, lead to a photomultiplier, the four cross-hatched input surfaces cut by coordinate Y2 lead to a further multiplier, and so forth.

From FIG. 3 it may be ascertained that the arrangement of the input surfaces of the light conductors is fully symmetrically obtained. In this manner an assured positioning is thus rendered possible.

In the exemplary embodiment according to FIG. 3 there are only required five photomultipliers for each coordinate for a total of thirty six therewith associated light conductors. In the example represented in FIG. 2 the arrangement of the input surfaces 22 is more closely matched with the circular output screen of the image intensifier 16, and connections are provided for 52 photoconductors which lead to 12 transducers. The input surfaces 22 in FIG. 2 are only schematically illustrated. Their representation, and particularly their quantity, does not conform to their actual relationships.

In order to elucidate the function of the positioning system, in FIG. 4 there is illustrated a section of the output screen 17 of the image intensifier 16. Further, there is schematically illustrated the scintillation crystal 12, onto which there impinges, for example, in the direction of arrow 47 a gamma quantum so as to thereby produce a scintillation 48. The light of the scintillation 48 diffuses within crystal 12, and after amplification is conveyed from the output screen 17, for example, to the inputs of the light conductors 49 through 53. The center of the light quantity and the most intense illumination lies thereby above the inlets of the middle light conductors 50, 51 and 52. For positioning it is required that the major portion of the light is not too wide, and that particularly the width of the major portion is lower than approximately half of the distance between $a$ and $d$. At larger widths there are formed electrons in the image intensifier, which unnecessarily adversely affect the solution.

As has been previously mentioned, for positioning not all of the fifty two photoconductors as in FIG. 2 are utilized, but only those transducers are employed which are associated with those light conductors which end in proximity to the formation of the scintillation 48 on the output screen 17.

The selection of the transducers which are employed for the positioning is effected on the basis of the intensity of the light focal points which are to be encompassed. If, for example, the output signals of those transducers which are associated with the light conductors 50, 51 and 52 lie above a predetermined value, there may be characterized thereby the regional portion $b$ to $c$, in effect, it relates to a light indication on the output screen 17 which belongs in the regional portion $b$ to $c$.

The selection of the regional portions which are utilized for the positioning is advantageously automatically obtained in that the signals of the transducers are shaped through suitable elements. This is explained in greater detail with reference to FIG. 5. FIG. 5 illustrates the duration of an output signal of the photomultipliers 23 through 34 in dependence upon the introduced light quantity L. From FIG. 5 it thus appears that the herein illustrated graph line does not extend in a linear manner. L max is the maximum light quantity which may be retained in a multiplier, and which is then conveyed to the multiplier when the therewith associated light conductors are located directly below an electron mass. $L_s$ is the stray light quantity which falls onto the multiplier when the electron mass is far removed from the therewith associated light conductors. When the graph line of that type provides the basis for the formulation of an output signal of the multiplier, then all signals below $L_s$, and also signals which are not required for the positioning are supressed, in effect, are not considered. Experiments have indicated that a linear formation may be obtained when, for example, three multipliers are employed for the positioning, and signals of the remaining multipliers are completely suppressed.

The characteristics pursuant to FIG. 5 may, in a known manner, be produced through nonlinear elements, for example, through diode sections.

In FIG. 6, there is illustrated an arrangement which permits the balancing of the differences between the light conductive capacities of the individual light conductors. Thus, FIG. 6 illustrates a balancing arrangement associated with a light conductor, for example, light conductor 20. An arrangement of this type is associated with each individual one of the light conductors.

The balancing arrangement according to FIG. 6 is located at the end of the photoconductors 20 proximate the inlet of the photomultiplier 30. It consists of a pair of shutters 60, 61 which may be adjusted by means of two screw adjusting devices 62 and 63 in the direction of arrows 64 and 65. For effecting balancing there are next completely blocked off the light conductor leading to a transducer, such as transducer 30, by means of a shutter, such as for example shutter 60, and only in light conductor 20, is the flow of light freely permitted by the shutter 60. The balancing may then be effected by means of shutter 61 in response to the output signal of the multiplier 30, which in this instance is obtained exclusively by the flow of light through the light conductor 20. The balancing of the subsequent light conductor is obtained in an identical manner, in effect, at any balancing all photoconductors are always blocked off up to the to be balanced light conductor by means of the shutter 60. The balancing of the light conductor which is to be balanced is then carried out by means of shutter 61. After the balancing is accomplished all of the shutters 60 are again fully opened. The balancing is obtained by means of a predetermined output signal of the particular photomultiplier.

In lieu of the utilization of two screw adjustment installations, the shutter 60, which need only be an open-close aperture, may directly be manually adjusted into its closed position. The shutter 61 must be, however, adjustable by means of a screw adjusting arrangement 63, or any similar adjusting arrangement for achieving precise balancing.

Within the scope of the invention there is also understood to be included the concept of image intensifiers, individual image intensifiers as well as cascade-type separate switching arrangements of various image intensifiers, as illustrated in the described exemplary embodiment.

We claim:

1. In a gamma camera for determining the distribution of radioactive materials in a body; comprising a scintillation layer; image intensifying means having an output screen operatively associated with said scintillation layer; photoelectric transducers; light conductor means interconnecting said photoelectric transducers and said output screen; and signal evaluating and indicating means connected to the output side of said transducers, the improvement comprising: individual adjustable shutter means being associated with respectively each of said light conductor means for adjustably varying and balancing the flow of light through said light conductor means with respect to each other.

2. A camera as claimed in claim 1, comprising a plurality of said light conductor means, each of said light conductor means having respectively one of said shutter means communicating therewith.

3. A camera as claimed in claim 1, said shutter means comprising a pair of shutters adjustable independently of each other, a first one of said shutters forming a closure member and the other of said shutters being adjustable.

* * * * *